Dec. 13, 1938.    L. E. W. VAN ALBADA    2,139,782
FILM HOLDER FOR STEREOSCOPIC PICTURES
Filed Nov. 16, 1937    2 Sheets-Sheet 1

Inventor
Lieuwe E. W. van Albada

Patented Dec. 13, 1938

2,139,782

UNITED STATES PATENT OFFICE 2,139,782

FILM HOLDER FOR STEREOSCOPIC PICTURES

Lieuwe E. W. Van Albada, Bloemendaal, Netherlands

Application November 16, 1937, Serial No. 174,753

4 Claims. (Cl. 95—18)

It is well known, that the usual cameras for stereoscopic pictures, consisting of a camera, provided with two spaced identical objectives and built for plates, plan- or rollfilms, produce negatives on which the two images of a near object have a greater distance from each other than those of a far object.

As in a positive stereoscopic picture the two images of a near object must lie nearer to each other than those of a far object the positive copy cannot be made merely by contact-printing in one exposure. Always must be made use of a method by which either the two images change their places or by which each image optically is turned 180° round its own center.

There are also stereoscopic cameras in which the interchange of the two images is effected with the aid of exterior or interior mirrors, of a second pair of objectives, inverting the images of the first pair, only speaking of cameras for simultaneous exposures, but these devices always are connected with encumbrances and disadvantages of different kinds, that limited their application.

The object of this invention is a roll-filmholder for stereoscopic pictures on the film of which, in simultaneous exposures, the two images of a near object are formed nearer to each other than those of a far object, without making use of mirrors, additional lenses, interchangeable magazines etc., the desired result only being obtained by folding and guiding the film in a special way, as described below.

In this specification which is a continuation in part of my application, Serial No. 84,971, filed June 12, 1936, a stereoscopic picture, be it negative or positive, on which the images of a near object are nearer to each other than those of a far object, may be indicated by the word: "orthoscopic" and a stereoscopic picture, negative or positive, as produced by a usual stereoscopic camera, on which the images of a far object are nearer to each other than those of a near object, by the word: "pseudoscopic".

The invention consists substantially in the fact, that we obtain a film with orthoscopic pictures if we bring the two focal or image-planes of a usual stereoscopic camera, or the two parts of a usual pseudoscopic negative, so in contact with the two image-receiving filmparts, that the latter, not are connected by their inner edges, but only by their outer edges.

Figure 1:
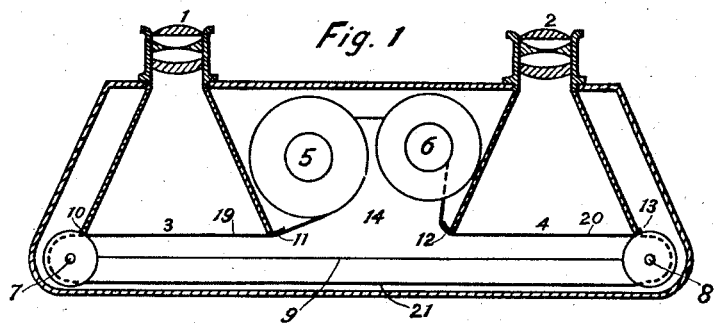
Figure 2:
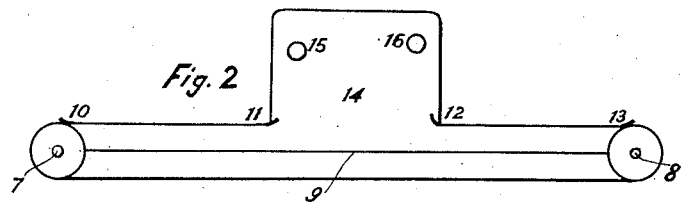
Figure 3:
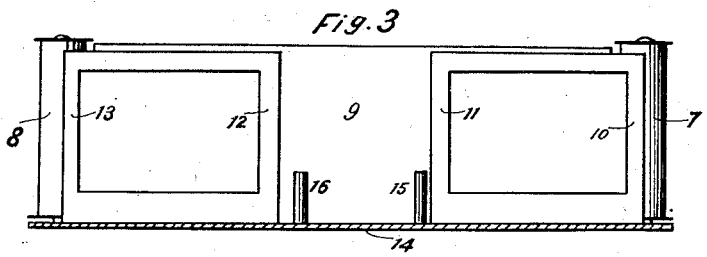
Figure 4:
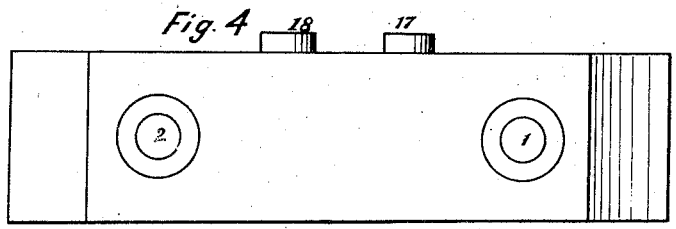
Figure 5:
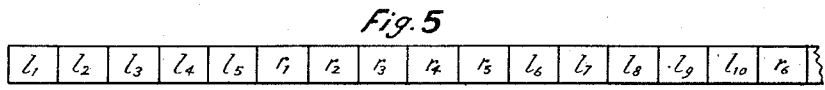
Figure 6:
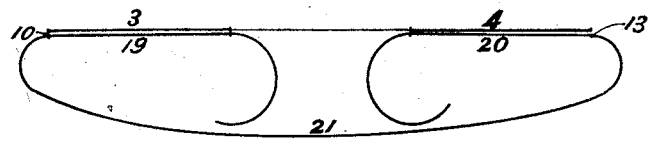
Figure 7:
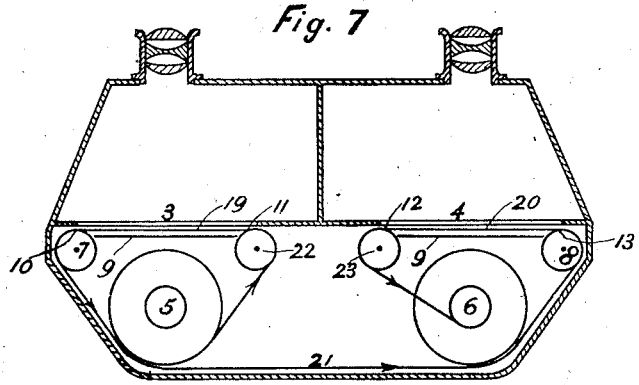

Fig. 1 shows schematically the position of the supply roll and the receiving roll in one case and of the rolls guiding the film in a flat loop across the focal planes of the objectives; Fig. 2 shows the filmholder, separately, with the guiding rolls and the axes for the supply roll and the receiving roll, seen from above; Fig. 3 shows the empty filmholder seen in front; Fig. 4 shows a frontal view of a camera provided with the filmholder; Fig. 5 shows the order of succession of the images as they appear on the flat stretched film; Fig. 6 illustrates the substantial principle of the invention schematically; Fig. 7 shows a second type of the filmholder in a camera and Fig. 8 the filmholder in a contact-printing apparatus.

The principle of the invention is illustrated in Fig. 6, in which 3 and 4 indicate the two parts of a usual pseudoscopic negative, connected by their inner edges, or the image-planes of a usual stereoscopic camera, and 19 and 20 the two image-receiving filmparts, coinciding with them, the outer edges, 10 and 13 of said filmparts being linked together by part 21 of the film.

The placing of the supply and the receiving roll is indifferent, not decisive and therefore allows various executive forms of the invention, the following three examples of which are described.

Beholding Fig. 1 nearer we see the casing of a camera and its two objectives 1 and 2 with their focal planes 3 and 4.

The bottomplate of the camera is a cover, that can be removed and used as filmholder, marked with the numbers 6—14.

The filmholder, separately shown in Figs. 2 and 3, consists of a bottomplate 14, bearing the supply roll 5 and the receiving roll 6, turnable on fixed axes 15 and 16 with the aid of the knurled knobs 17 and 18, shown in Fig. 4.

The focal planes of the objectives are marked by vertical, rounded metal edges 10 and 11, 12 and 13, which are fastened on the bottomplate 14 of the filmholder.

Likewise the vertical axes of the rolls 7 and 8 are fastened on the bottomplate 14 and also a vertical metal screen 9 between them.

The film, indicated by the numerals 19, 20 and 21, is guided from the supply roll 5 behind the rounded edges 11 and 10, over roll 7, behind screen 9 to roll 8, behind the rounded edges 13 and 12 to receiving roll 6. The outer edges 10 and 13 of the two image-receiving filmparts 19 and 20 are connected by filmpart 21.

Taking the distance of the objective-axes 3″, the free space between each pair of rounded edges or the horizontal dimension of each image 1½″, the filmloop round the rolls 7 and 8 each 1¾″, the two images of the same stereoscopic picture will be separated on the flat stretched film by a space of 6″.

The image of successive stereoscopic pictures thus arrange themselves on the flat stretched film after the scheme given in Fig. 5, in which the successive left images are indicated by $l_1$, $l_2$, $l_3$ etc., and the corresponding right images by $r_1$, $r_2$, $r_3$ etc.

On this stretched film the two images of a near object are nearer to each other than those of a far object, thus forming an orthoscopic stereoscopic picture.

It is true that the distance between two corresponding images is much larger than the distance of human eyes, but in using a stereoscope as described in Van Albada Patent No. 2,033,902 March 10, 1936 the space between them only forms a loop, that allows to bring them at the exact distance of the eyes of the observer.

Fig. 7 shows another example of a stereoscopic camera provided with the filmholder, the supply and the receiving roll now being placed behind the focal planes of the objectives and the filmpart 21, linking the outer edges of the two pictures together, is guided backwardly round the two rolls.

The inner metal edges 11 and 12 of Fig. 1 are here substituted by guiding rolls 22 and 23.

Figure 8:
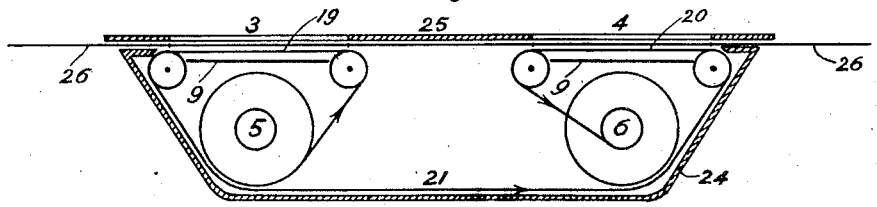

Fig. 8 represents a section through a printing apparatus showing a casing 24, shut in front by a hinging cover 25 with two exposure apertures 3 and 4, said cover keeping the pseudoscopic stereoscopic negative 26, to be copied orthoscopically on an unexposed film, contained in a supply roll 5 and guided in the above mentioned way below the negative film to the receiving roll 6.

Opaque partitions 9 protect the filmparts, not lying in the plane of the exposure apertures, against intrusive light.

I claim:

1. A roll-filmholder for stereoscopic pictures, consisting of a plate, bearing the axes for a supply roll and a receiving roll and guiding rolls or rounded guiding supports outside of each image-window or exposure aperture, forming means for guiding a film from the supply roll first to the inner edge of and across one exposure aperture to the outer edge of said aperture, from there successively to the outer and the inner edge of the second exposure aperture and finally to said receiving roll, an opaque partition between said exposure apertures and the filmparts not lying in said apertures.

2. A roll-holding stereoscopic camera comprising a casing, two lenses arranged side by side in the front of said casing, a light chamber extending rearwardly from each lens and having an exposure aperture located at the focal plane of its lens, said chambers being spaced apart, a supply roll and a receiving roll, placed outside of said chambers, means for guiding a film from the supply roll first to the inner edge of and across the focal plane of one chamber to the outer edge of said plane, from there reversely across said casing successively to the outer and the inner edge of the focal plane of the second chamber and finally to said receiving roll, an opaque partition between said focal planes and the filmparts not lying in said planes.

3. A roll-holding stereoscopic camera comprising a casing, two lenses arranged side by side in the front of said casing, a light chamber extending rearwardly from each lens and having an exposure aperture located at the focal plane of its lens, said chambers being spaced apart, a supply and a receiving roll located in the space between said chambers, an opaque partition back of said chambers and spaced from their focal planes and the back of said casing and means for guiding a film from the supply roll outwardly across the focal plane of one chamber in front of said partition, then reversely back of the second chamber and in front of said partition to said receiving roll.

4. A roll-holding printing apparatus consisting of a casing with two exposure apertures arranged side by side in the front of said casing, said front being a hinging cover to keep the negative film under the exposure apertures, said casing containing a supply roll and a receiving roll, means for guiding a film from the supply roll first to the inner edge of and across one exposure aperture to the outer edge of said aperture, from there reversely across said casing successively to the outer and the inner edge of the second exposure aperture and finally to said receiving roll, an opaque partition between said exposure apertures and the filmparts not lying in the plane of said exposure apertures.

LIEUWE E. W. VAN ALBADA.